US010970806B2

(12) United States Patent
Tsukamoto

(10) Patent No.: US 10,970,806 B2
(45) Date of Patent: Apr. 6, 2021

(54) EXTERNAL GPU MANAGEMENT

(71) Applicant: LENOVO (Singapore) PTE. LTD., New Tech Park (SG)

(72) Inventor: Yasushi Tsukamoto, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/549,324

(22) Filed: Aug. 23, 2019

(65) Prior Publication Data

US 2020/0065934 A1   Feb. 27, 2020

(30) Foreign Application Priority Data

Aug. 24, 2018 (JP) .............................. JP2018-157591

(51) Int. Cl.
| | |
|---|---|
| *G06T 1/20* | (2006.01) |
| *G06F 1/3293* | (2019.01) |
| *G06F 9/50* | (2006.01) |
| *G06F 1/3228* | (2019.01) |
| *G06F 1/3234* | (2019.01) |

(52) U.S. Cl.
CPC .............. *G06T 1/20* (2013.01); *G06F 1/3228* (2013.01); *G06F 1/3243* (2013.01); *G06F 1/3293* (2013.01); *G06F 9/5027* (2013.01)

(58) Field of Classification Search
CPC ......... G06T 1/20; G09G 5/363; G06F 1/1632; G06F 1/3228; G06F 1/3243; G06F 1/3293; G06F 9/485; G06F 9/5027; G06F 13/4081

USPC ................................................... 345/501, 502
See application file for complete search history.

(56) References Cited

U.S. PATENT DOCUMENTS

| | | | |
|---|---|---|---|
| 10,503,669 B2* | 12/2019 | Campbell ............. | G06F 1/3293 |
| 2011/0164046 A1* | 7/2011 | Niederauer ............ | G06F 1/325 |
| | | | 345/503 |
| 2013/0038615 A1* | 2/2013 | Hendry ................ | G06F 1/3206 |
| | | | 345/502 |
| 2016/0041931 A1* | 2/2016 | Gupta .................. | G06F 9/4856 |
| | | | 710/8 |

FOREIGN PATENT DOCUMENTS

| | | | |
|---|---|---|---|
| JP | H1011109 A | 1/1998 | |
| JP | H1165720 A | 3/1999 | |

(Continued)

*Primary Examiner* — Jacinta M Crawford

(74) *Attorney, Agent, or Firm* — Kunzler Bean & Adamson

(57) ABSTRACT

An apparatus is provided to improve external graphics processing unit management. The apparatus includes a request information acquisition unit configured to acquire disconnection request information for requesting disconnection of an external signal processing device, where the external signal processing device is configured to execute at least part of signal processing in processing performed by running the application. The apparatus also includes a storage unit capable of storing files utilized by the application, and an exit control unit configured to issue a first command, the first command indicative of an instruction to exit after saving working files to the storage unit, to an application using signal processing by the signal processing device among running applications in response to the request information acquisition unit receiving the disconnection request information.

15 Claims, 11 Drawing Sheets

(56) References Cited

FOREIGN PATENT DOCUMENTS

| JP | H11203231 A | 7/1999 |
|----|-------------|--------|
| JP | 2010020596 A | 1/2010 |
| JP | 2012090064 A | 5/2012 |
| JP | 2015-505395 A | 2/2015 |

* cited by examiner

EXTERNAL GPU MANAGEMENT

FIELD

The subject matter disclosed herein relates to information processing devices and more particularly relates to an improved system and method for the disconnection management of an external graphics processing unit.

BACKGROUND

An external graphics processing unit may be connected to a personal computer to enhance the processing capability. When an external graphics processing unit is removed and disconnected in such a state that applications are using the external graphics processing unit, the applications or the system may hang up. This is because the applications using the external graphics processing unit save at least some pieces of data to a memory inside the external graphics processing unit, and hence the data are disabled from being referred to. Currently, when disconnecting the external graphics processing unit, a list of applications using the external graphics processing unit is displayed to urge a user to exit from the applications to enable the disconnection. However, the user does not always exit from all the listed applications. Further, it is cumbersome and inconvenient to exit from the applications while saving data piece by piece.

SUMMARY

An apparatus is provided to improve external graphics processing unit management. The apparatus includes a request information acquisition unit configured to acquire disconnection request information for requesting disconnection of an external signal processing device, where the external signal processing device is configured to execute at least part of signal processing in processing performed by running the application. The apparatus also includes a storage unit capable of storing files utilized by the application, and an exit control unit configured to issue a first command, the first command indicative of an instruction to exit after saving working files to the storage unit, to an application using signal processing by the signal processing device among running applications in response to the request information acquisition unit receiving the disconnection request information.

In certain embodiments, the apparatus also includes a start control unit configured to issue a second command. The second command may be indicative of an instruction to restart in a resume mode for starting, after reading the files saved in the storage unit, to the application to which the exit control unit issues the first command when the disconnection of the signal processing device is detected.

In certain embodiments, the apparatus includes a list acquisition unit configured to acquire a list of applications using signal processing by the signal processing device among the running applications. The apparatus may also include a command acquisition unit to acquire information related to the second command defined in each application from the applications using signal processing by the signal processing device based on the list of applications acquired by the list acquisition unit.

In certain embodiments, the exit control unit issues the first command to an application from which the command acquisition unit acquires the information related to the second command in the list of applications acquired by the list acquisition unit. The exit control unit may also urge a user to perform operations to exit, after saving working files, from an application from which the command acquisition unit cannot acquire the information related to the second command in the list of applications acquired by the list acquisition unit.

In certain embodiments, the apparatus also includes a start control unit configured to issue a second command, indicative of an instruction to start in a resume mode for starting after reading the files saved in the storage unit, to the application to which the exit control unit issues the first command when reconnection of the signal processing device after the disconnection is detected. The apparatus may internally include a first signal processing unit configured to execute signal processing performed by running an application, and a second signal processing unit having a processing capacity higher than that of the first signal processing unit.

Corresponding systems and methods are provided to implement the features of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
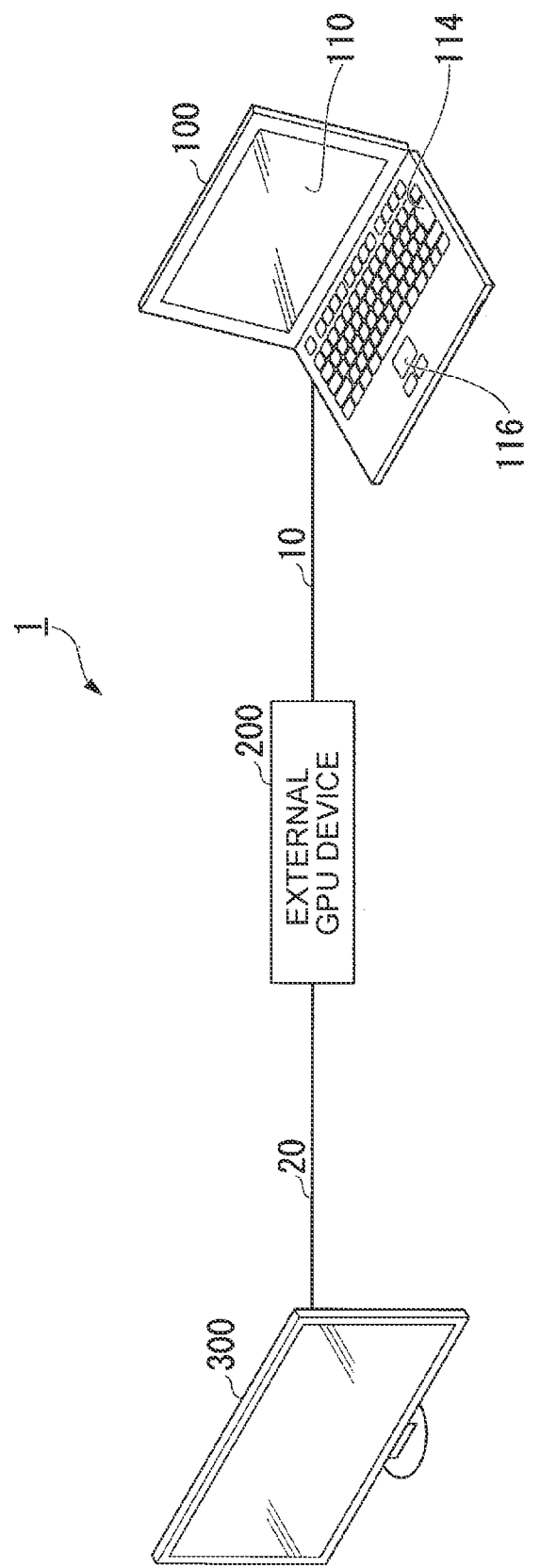
FIG. 1 is a block diagram illustrating an example of an information processing system according to embodiments of the present disclosure.

An embodiment of the present invention will be described in detail below with reference to the accompanying drawings. Note that the same portions in respective drawings are given the same reference numerals.

FIG. 1 is a block diagram illustrating an example of an information processing system according to the embodiment. For example, an information processing system 1 includes a personal computer 100, an external GPU (Graphics Processing Unit) device 200, and a display device 300. The personal computer 100 and the external GPU device 200 are connected through a first connection cable 10 to be data communicable with each other. The external GPU device 200 and the display device 300 are connected through a second connection cable 20 to be data communicable with each other.

The personal computer 100 is a laptop personal computer including a keyboard 114, a touch pad 116, and a display unit 110. For example, the personal computer 100 includes a built-in GPU, but the personal computer 100 can also have the external GPU device 200 perform drawing processing by establish the connection to the external GPU device 200.

The external GPU device 200 is an example of a signal processing device for executing at least part of signal processing in processing performed by the personal computer 100 running an application. For example, the external GPU device 200 is a drawing processing device including an external GPU (so-called eGPU) connected to the personal computer 100 to perform drawing processing for drawing a video to be displayed. As an example, the external GPU device 200 is higher in processing capacity than the built-in GPU of the personal computer 100 to attain high-speed graphics performance. The external GPU device 200 can connect to and disconnect from the personal computer 100, and can be dynamically added to the personal computer 100 as needed.

For example, the external GPU device 200 outputs a video signal, obtained by performing drawing processing on video data, to the display device 300 connected to the external GPU device 200 through the second connection cable 20. The display device 300 is an external display configured to include, for example, a liquid crystal display panel, an organic EL (Electroluminescence) display panel, or the like. The display device 300 displays a video based on the video signal output from the external GPU device 200. For example, the display device 300 can provide a display on a bigger screen with higher definition than the display unit 110 provided in the personal computer 100.

Note that the external GPU device 200 may also output the video signal after being subjected to drawing processing to the personal computer 100 connected to the external GPU device 200 through the first connection cable 10 to display the video on the display unit 110 of the personal computer 100. In other words, the video based on the video signal output from the external GPU device 200 may be displayed on either one of the display device 300 and the display unit 110 of the personal computer 100. In other words, the information processing system 1 illustrated in FIG. 1 includes the display device 300, but the present invention is not limited thereto. The information processing system 1 has only to include at least the personal computer 100 and the external GPU device 200 without including the display device 300.

Figure 2:
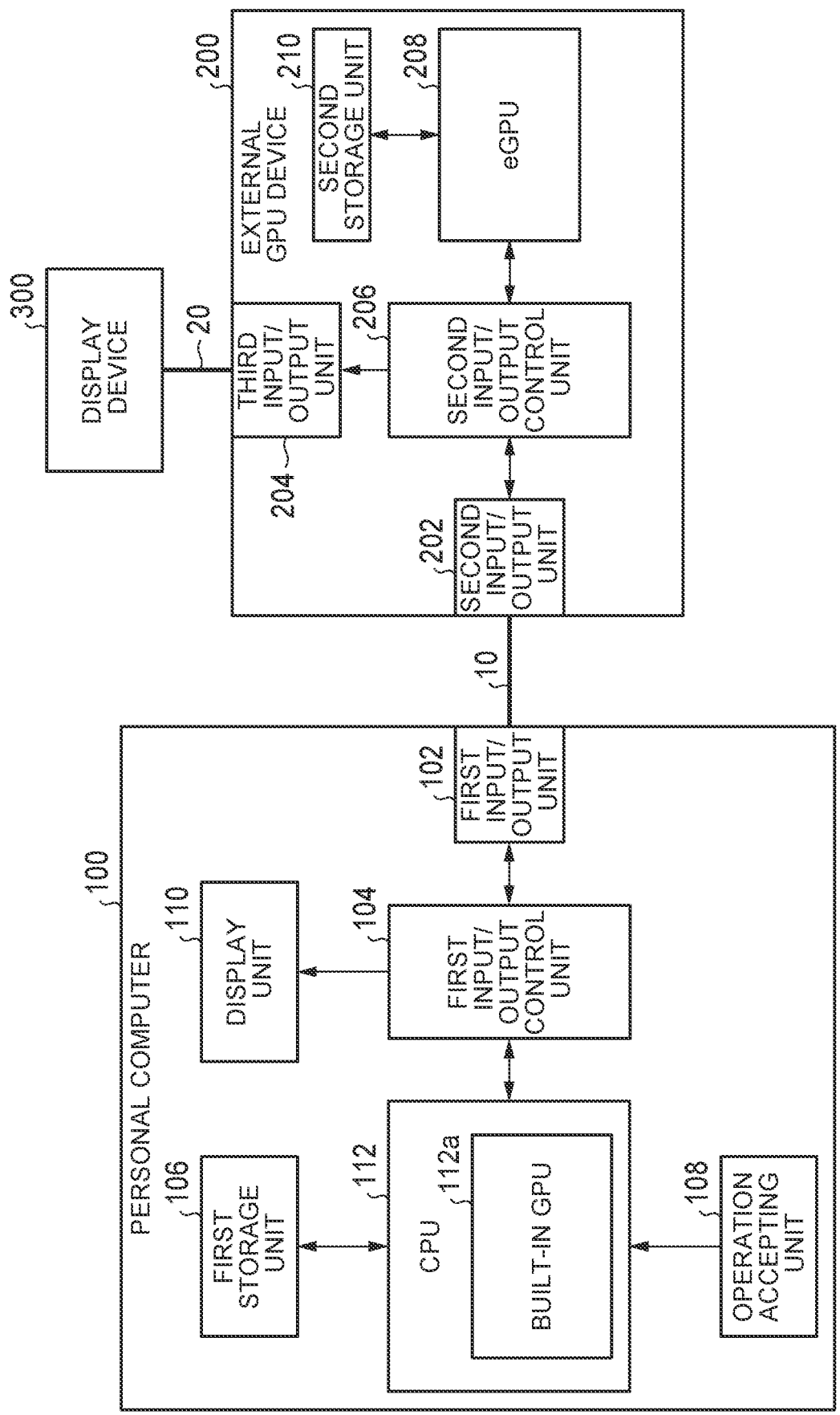
FIG. 2 is a block diagram illustrating the internal configurations of a personal computer and an external GPU device according to embodiments of the present disclosure.

FIG. 2 is a block diagram illustrating the internal configurations of the personal computer and the external GPU device according to the embodiment. The illustrated personal computer 100 includes a first input/output unit 102, a first input/output control unit 104, a first storage unit 106, an operation accepting unit 108, the display unit 110, and a CPU (Central Processing Unit) 112. The personal computer 100 is an example of an information processing apparatus. The information processing apparatus is not limited to a laptop personal computer, and it may be a desktop or tablet personal computer, a smartphone, or the like.

The first input/output unit 102 is an interface for input/output of data. For example, the first input/output unit 102 is connectable to the external GPU device 200 through the first connection cable 10. The first input/output unit 102 is, for example, an interface compliant with the Thunderbolt® 3 standard and configured to include a USB (Universal Serial Bus) Type-C connector.

The first input/output control unit 104 controls the operation of the first input/output unit 102. For example, when the external GPU device 200 is connected to the first input/output unit 102 through the first connection cable 10, the first input/output control unit 104 detects that the external GPU device 200 is connected. Then, when detecting that the external GPU device 200 is connected, the first input/output control unit 104 controls the operation of communication with the external GPU device 200 performed through the first input/output unit 102. Further, when the external GPU device 200 connected to the first input/output unit 102 through the first connection cable 10 is removed, the first input/output control unit 104 detects that the external GPU device 200 is disconnected.

Further, the first input/output control unit 104 controls whether to output a video signal to the display unit 110. For example, when the display of a built-in monitor of the personal computer 100 is set to ON, the first input/output control unit 104 outputs the video signal to the display unit 110. On the other hand, when the display of the built-in monitor of the personal computer 100 is set to OFF, the first input/output control unit 104 does not output the video signal to the display unit 110. The ON/OFF setting of the display of the built-in monitor is set with a user's operation to the keyboard 114 or a user's operation to a setting screen provided by an OS (Operating System).

The first storage unit 106 includes, for example, an HDD (Hard Disk Drive) or an SSD (Solid State Drive), an EEPROM (Electrically Erasable Programmable Read-Only Memory), a ROM (Read-Only Memory), a RAM (Random Access Memory), and the like to store various pieces of information and video data processed by the personal computer 100, programs, and the like. Note that the first storage unit 106 is not limited to the storage unit built in the personal computer 100, and an external storage device connected via a digital input/output port such as USB may also be included.

The operation accepting unit 108 accepts user's operations to the keyboard 114 and the touch pad 116 provided in the personal computer 100, and outputs operation signals based on the accepted operations. When the display unit 110 is configured as a touch panel, the operation accepting unit 108 may accept user's operations to the touch panel. Further, the operation accepting unit 108 may accept user's operations to an external operation device such as a mouse connected via USB or the like.

The display unit 110 is a display for displaying information such as video and text, which is configured to include, for example, a liquid crystal display panel, an organic EL display panel, or the like.

The CPU 112 executes an OS program and various application programs stored in the first storage unit 106 to perform various operations, control, processing, and the like. Further, for example, the CPU 112 includes a built-in GPU 112a configured to perform drawing processing for drawing a video to be displayed in processing performed by running various applications. The built-in GPU 112*a* performs drawing processing on video data to generate a video signal. The CPU 112 outputs the generated video signal to the first input/output control unit 104. Further, when the drawing processing for drawing the video to be displayed is performed by the external GPU device 200, the CPU 112 outputs, to the first input/output control unit 104, video data before being subjected to drawing processing performed by the built-in GPU 112*a* mentioned above. Thus, the first input/output control unit 104 outputs the video data to the external GPU device 200 through the first connection cable 10 connected to the first input/output unit 102.

The external GPU device 200 includes, for example, a second input/output unit 202, a third input/output unit 204, a second input/output control unit 206, an eGPU 208, and a second storage unit 210.

The second input/output unit 202 is an interface for input/output of data. For example, the second input/output unit 202 is connectable to the personal computer 100 through the first connection cable 10. Note that the second input/output unit 202 is, for example, an interface compliant with the Thunderbolt® 3 standard and configured to include a USB (Universal Serial Bus) Type-C connector.

The third input/output unit 204 outputs a video signal to the display device 300 connected through the second connection cable 20. For example, the third input/output unit 204 is, for example, an interface compliant with the Thunderbolt® 3 standard and configured to include a USB (Universal Serial Bus) Type-C connector. Note that the third input/output unit 204 may also be an output dedicated interface compliant with Display Port or HDMI® (High-Definition Multimedia Interface).

The second input/output control unit 206 controls the operation of the second input/output unit 202 and the third input/output unit 204. For example, the second input/output control unit 206 acquires video data from the personal computer 100 connected to the second input/output unit 202 through the first connection cable 10. Further, the second input/output control unit 206 outputs a video signal, generated by the eGPU 208 performing drawing processing on the acquired video data, to the display device 300 connected to the third input/output unit 204 through the second connection cable 20. Note that the second input/output control unit 206 may output the generated video signal to the personal computer 100 connected to the second input/output unit 202 through the first connection cable 10.

The eGPU 208 is an arithmetic unit (processor) specialized in drawing processing for drawing a video. The eGPU 208 performs drawing processing on video data output from the personal computer 100 to draw the video to be displayed.

The second storage unit 210 is a volatile memory (for example, a RAM (Random Access Memory)), which is used as a frame buffer or the like when the eGPU 208 performs the drawing processing. For example, video data on which the eGPU 208 performs the drawing processing (video data output from the personal computer 100), data after being subjected to the drawing processing performed by the eGPU 208, and the like are stored in the second storage unit 210.

Here, in a state where applications running on the personal computer 100 are using the external GPU device 200, if the external GPU device 200 is disconnected, the applications and the system will hang up. This is because the applications using the external GPU device 200 save at least some pieces of data in the second storage unit 210 inside the external GPU device 200, and hence the data are disabled from being referred to.

Therefore, in the embodiment, when the external GPU device 200 is disconnected, processing is performed to exit from the applications using the external GPU device 200 after automatically saving files open in the applications into the personal computer 100 before the disconnection, and the closed applications are restarted in a resume mode after the disconnection of the external GPU device 200. This processing upon disconnection of the external GPU device 200 is called "eGPU disconnection processing" below. The resume mode is a mode of restoring the applications to a state just before the exit. For example, Requirement (Application Resume & Restart) for implementing the resume method for applications are defined in Windows Vista® or later, and many applications support this definition (i.e., compatible with the resume mode).

The eGPU disconnection processing is realized, for example, by installing and executing, on the personal computer 100, programs (device drivers, applications, and the like) provided in association with the external GPU device 200. The device drivers and the applications provided in association with this external GPU device 200 are executed by starting the personal computer 100 to reside in the personal computer 100. The device drivers and the applications provided in association with this external GPU device 200 are collectively called the "eGPU app" below.

Figure 3:
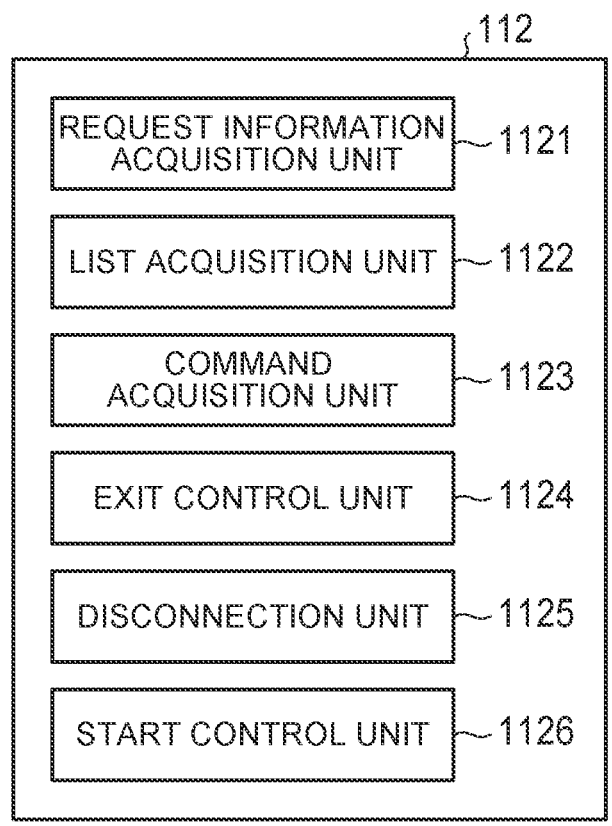
FIG. 3 is a block diagram illustrating an example of the functional configuration of a CPU according to embodiments of the present disclosure.

Referring next to FIG. 3, a functional configuration related to eGPU disconnection processing and realized by the CPU 112 executing the eGPU app will be described. FIG. 3 is an example of the functional configuration of the CPU 112 according to the embodiment. The CPU 112 includes, as the functional configuration related to the eGPU disconnection processing, a request information acquisition unit 1121, a list acquisition unit 1122, a command acquisition unit 1123, an exit control unit 1124, a disconnection unit 1125, and a start control unit 1126.

Based on a user's operation, the request information acquisition unit 1121 acquires disconnection request information for requesting disconnection of the external GPU device 200. The user's operation is an operation to give an instruction for disconnection (removal) of the external GPU device 200. The operation to give the instruction for disconnection of the external GPU device 200 is, for example, an operation to a button (software button) displayed on the screen by the eGPU app to give the instruction for disconnection of the external GPU device 200.

Note that the above-mentioned operation may be an operation to an icon of a connected device displayed in an indicator on an OS desktop screen to give an instruction for removal (for example, an operation to select "Removal" from options appearing with the right click of the mouse). When a physical button (hardware button) is provided on the chassis of the external GPU device 200 to give the instruction for disconnection of the external GPU device 200, the above-mentioned operation may be an operation to the button. Further, when the physical button to give the instruction for disconnection of the external GPU device 200 is provided as one of buttons on the keyboard 114 of the personal computer 100, the above-mentioned operation may be an operation to the button. Further, when a mechanism for locking the connection of the external GPU device 200 temporarily to prevent the external GPU device 200 from being disconnected accidentally is provided (for example, when a docking station or the like to lock the connection to the first connection cable 10 by placing the external GPU device 200 on the platform is provided), the above-mentioned operation may be an operation to a physical button or a lever for unlocking the external GPU device 200.

Figure 4:
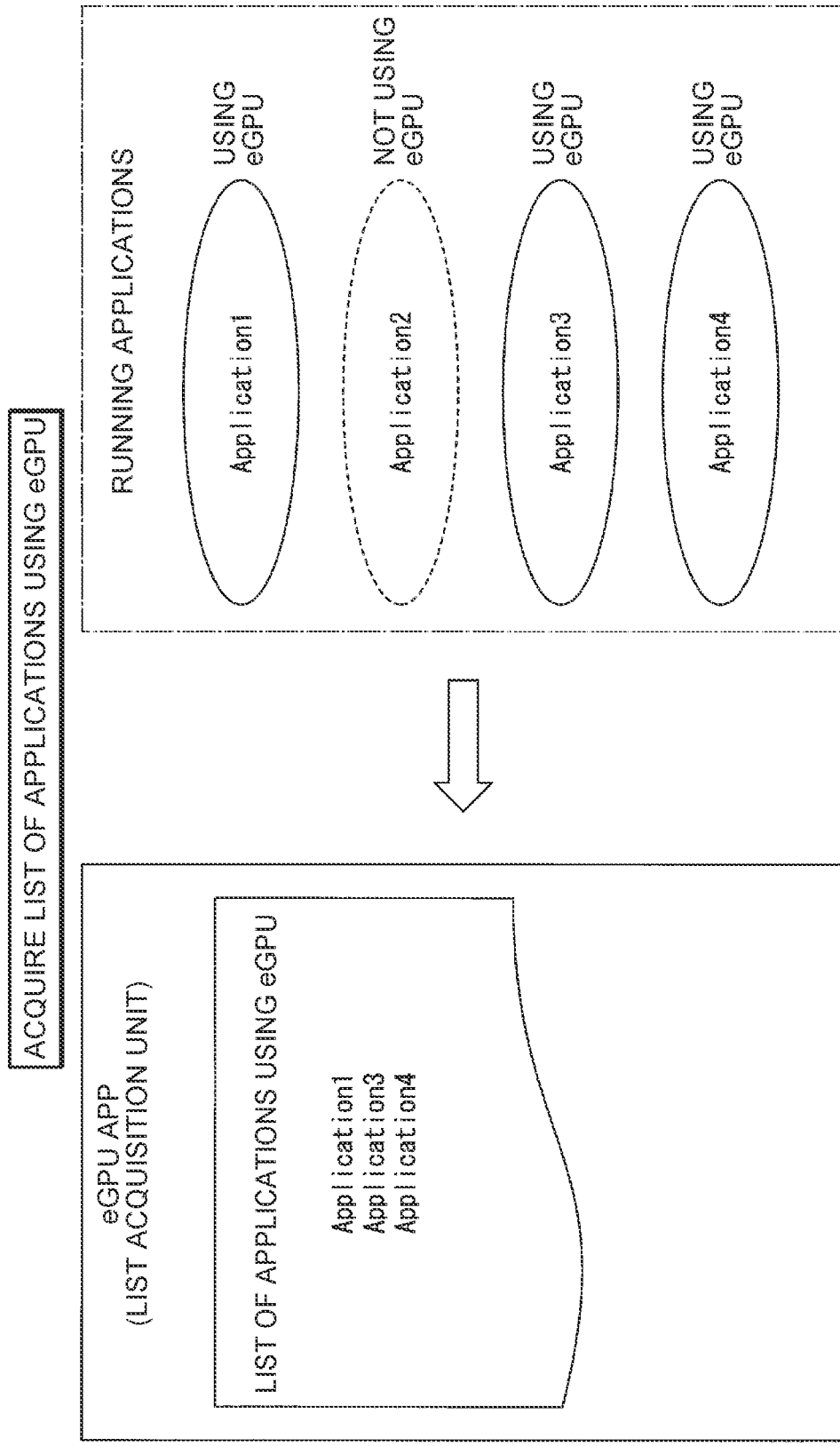
FIG. 4 is an explanatory diagram of processing for acquiring a list of applications using an eGPU according to embodiments of the present disclosure.

In such a state that the external GPU device 200 is connected to the personal computer 100, the list acquisition unit 1122 acquires a list of applications using the drawing processing by the external GPU device 200 (applications using the eGPU) among applications running on the personal computer 100. FIG. 4 is an explanatory diagram of processing for acquiring the list of applications using the eGPU. In the illustrated example, application 1, application 2, application 3, and application 4 are running applications. Among them, applications using the eGPU are application 1, application 3, and application 4. For example, the list acquisition unit 1122 issues a command for acquiring the list of applications using the eGPU among commands defined in the external GPU device 200 to get application 1, application 3, and application 4 as applications using the eGPU.

Figure 5:
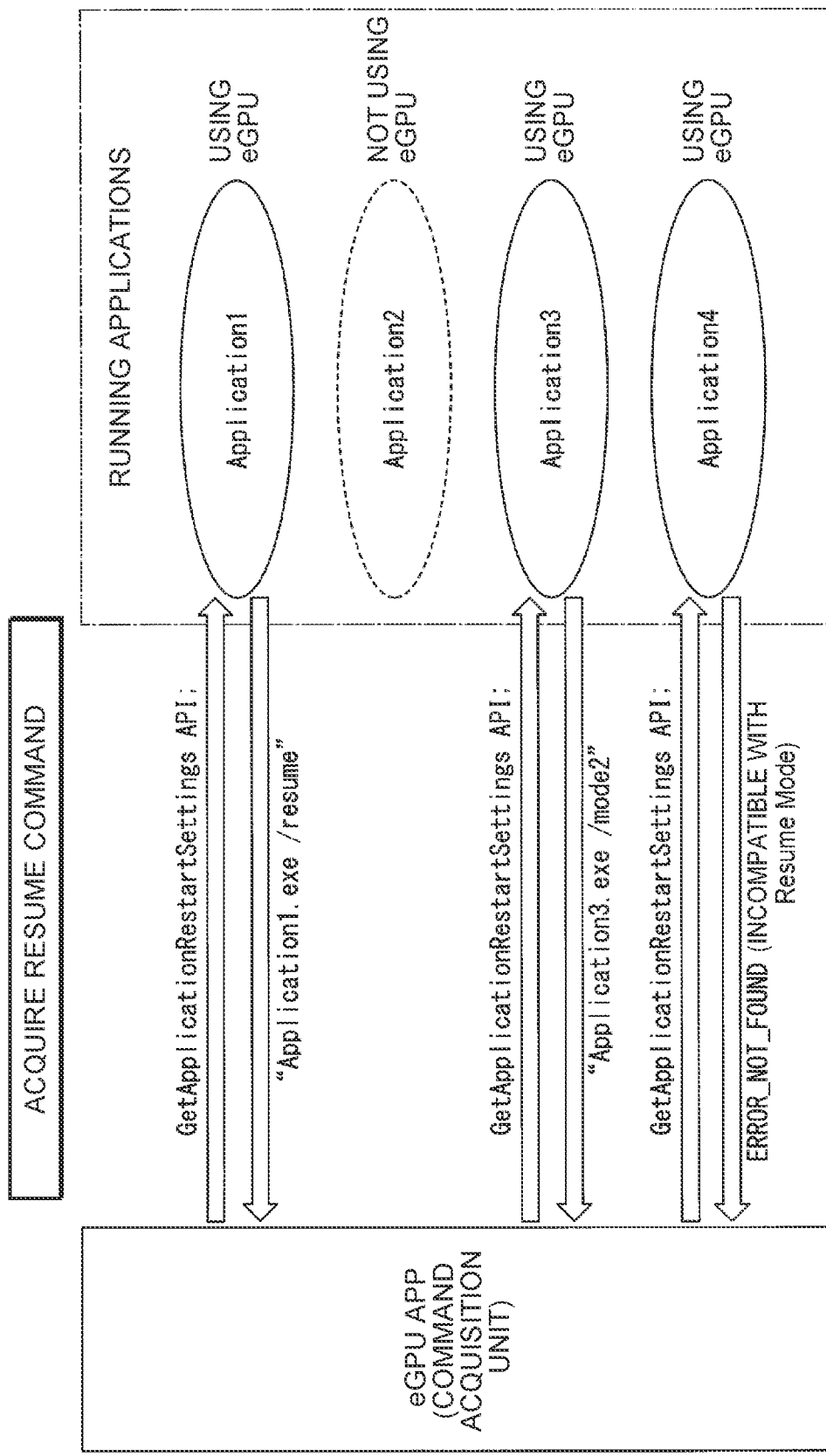
FIG. 5 is an explanatory diagram of processing for acquiring, from applications using the eGPU, information related to each resume command according to embodiments of the present disclosure.

Based on the list of applications acquired by the list acquisition unit 1122, the command acquisition unit 1123 acquires, from the applications using the eGPU, information related to a resume command defined in each of the applications. The resume command is a command for restarting in the resume mode, which is defined independently in each application. The command acquisition unit 1123 acquires, from each application using the eGPU, the description content of the resume command defined in the application so that the application using the eGPU can be restarted in the resume mode after the application is closed FIG. 5 is an explanatory diagram of processing for acquiring, from each of the applications using the eGPU, information related to the resume command. For example, the command acquisition unit 1123 selectively specifies each of applications using the eGPU to issue a command defined in the OS to acquire a resume command (for example, "GetApplicationRestartSettings API;" defined in Windows®) in order to acquire the description content of the resume command defined in each of the applications using the eGPU. In other words, the command acquisition unit 1123 issues the command for acquiring the resume command only to the applications using the eGPU among running applications, rather than to all the running applications.

In the illustrated example, application 1 returns "Application1.exe/resume" as the description content of the resume command. Application 2 returns "Application3.exe/mode2" as the description content of the resume command. When there is any application incompatible with the restart in the resume mode, the application returns an error. Here, an example in which application 4 is the application incompatible with the restart in the resume mode is illustrated. If all the applications using the eGPU are compatible with the restart in the resume mode, all the applications using the eGPU will return the description content of resume commands defined in respective applications.

When the request information acquisition unit 1121 acquires the disconnection request information, the exit control unit 1124 issues, to the applications using the eGPU among running applications, an exit-after-save command indicative of an instruction to exit after saving working files to the first storage unit 106. For example, the exit control unit 1124 issues the exit-after-save command to the applications, from which the command acquisition unit 1123 acquires the information related to the resume command in the list of applications acquired by the list acquisition unit 1122 (that is, the applications compatible with the resume mode). Each of the applications to which the exit-after-save command is issued uses the application function to exit after saving working files to the first storage unit 106.

Figure 6:
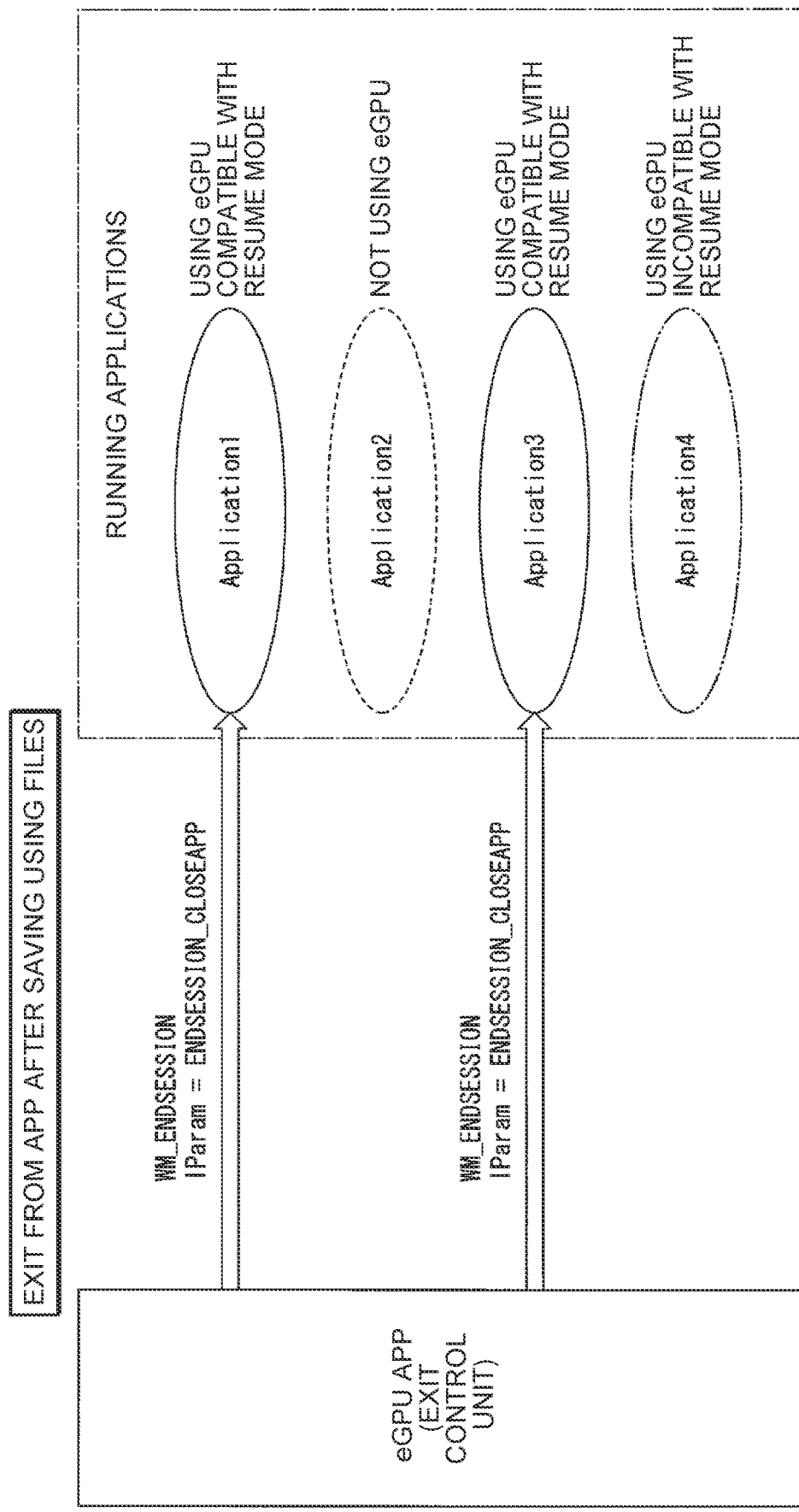
FIG. 6 is an explanatory diagram of processing for saving/exiting from the applications using the eGPU according to embodiments of the present disclosure.

FIG. 6 is an explanatory diagram of processing for saving/exiting from the applications using the eGPU. For example, the exit control unit 1124 issues, selectively only to the applications using the eGPU, the exit-after-save command with a special exit message flag (ENDSESSION_CLOSEAPP) attached to "WM_ENDSESSION" defined in Windows® to start in the resume mode upon the next start-up. Note that this exit-after-save command is a command broadcast to all running applications, for example, before the restart of Windows Update.

Further, the exit control unit 1124 displays information for urging the user to exit after saving working files open in applications from which the command acquisition unit 1123 was not able to acquire the information related to the resume command in the list of applications acquired by the list acquisition unit 1122 (that is, the applications incompatible with the resume mode). The applications incompatible with the resume mode are, for example, applications that do not support Requirement (Application Resume & Restart) for implementing the resume method for applications defined in Windows Vista® or later.

Figure 7:
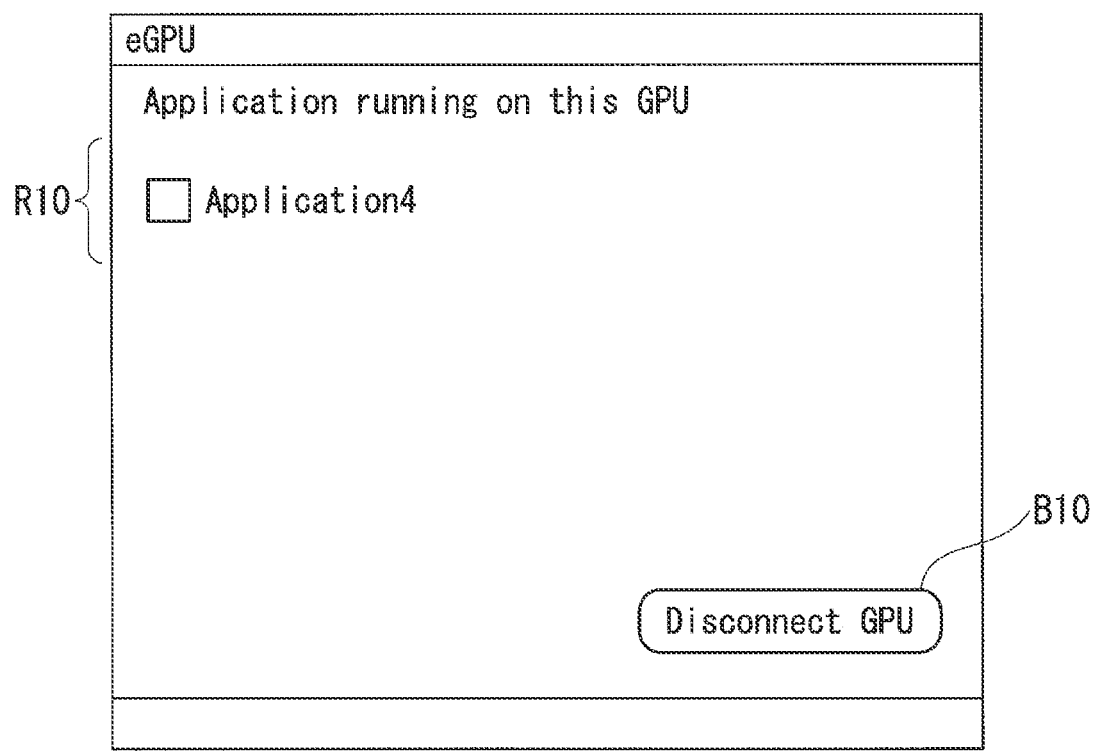
FIG. 7 is a diagram illustrating an example of a display screen by an eGPU app according to embodiments of the present disclosure.

FIG. 7 is a diagram illustrating an example of a display screen by the eGPU app. This diagram is a display example when there is any application incompatible with the resume mode. In an area indicated by reference numeral R10 on the illustrated display screen, a list of applications incompatible with the resume mode among applications using the eGPU is displayed (here, application 4). Further, a button B 10 is an example of a button (software button) to give instruction to disconnect the external GPU device 200. On this display screen, information for urging the user to perform an operation, such as a message saying "exit after saving working files" may also be displayed.

Figure 8:
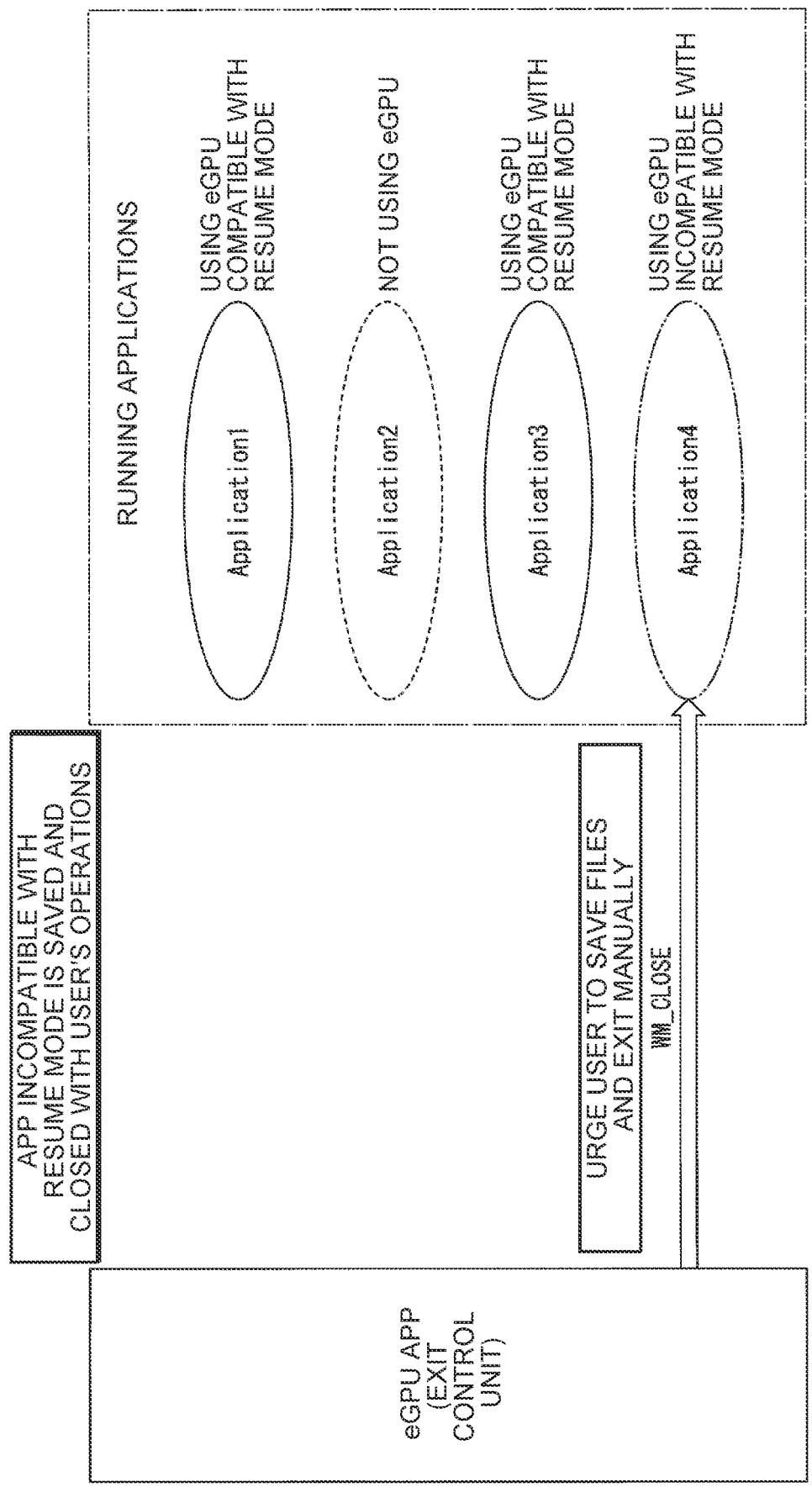
FIG. 8 is an explanatory diagram of processing for exiting from an application incompatible with a resume mode according to embodiments of the present disclosure.

When the user performs an operation to give an instruction to exit from application 4, the exit control unit 1124 issues a normal exit command. FIG. 8 is an explanatory diagram of processing for exiting from an application incompatible with the resume mode. As illustrated, the exit control unit 1124 issues, to any application incompatible with the resume mode, that is, only to application 4 here, the normal exit command (for example, "WM_CLOSE" defined in Windows®.

After the applications using the eGPU are closed, the disconnection unit 1125 disconnects the external GPU device 200. For example, the disconnection unit 1125 disconnects the external GPU device 200 by a disconnect command defined in the external GPU device 200 or a device deactivate API.

When the disconnection of the external GPU device 200 is detected, the start control unit 1126 issues, to the applications compatible with the resume mode and to which the exit-after-save command is issued by the exit control unit 1124, a resume command indicative of an instruction to restart in the resume mode, i.e., to start after reading the files saved in the first storage unit 106. In this instance, as the resume command issued to each application, each resume command acquired by the command acquisition unit 1123 is used, respectively.

Figure 9:
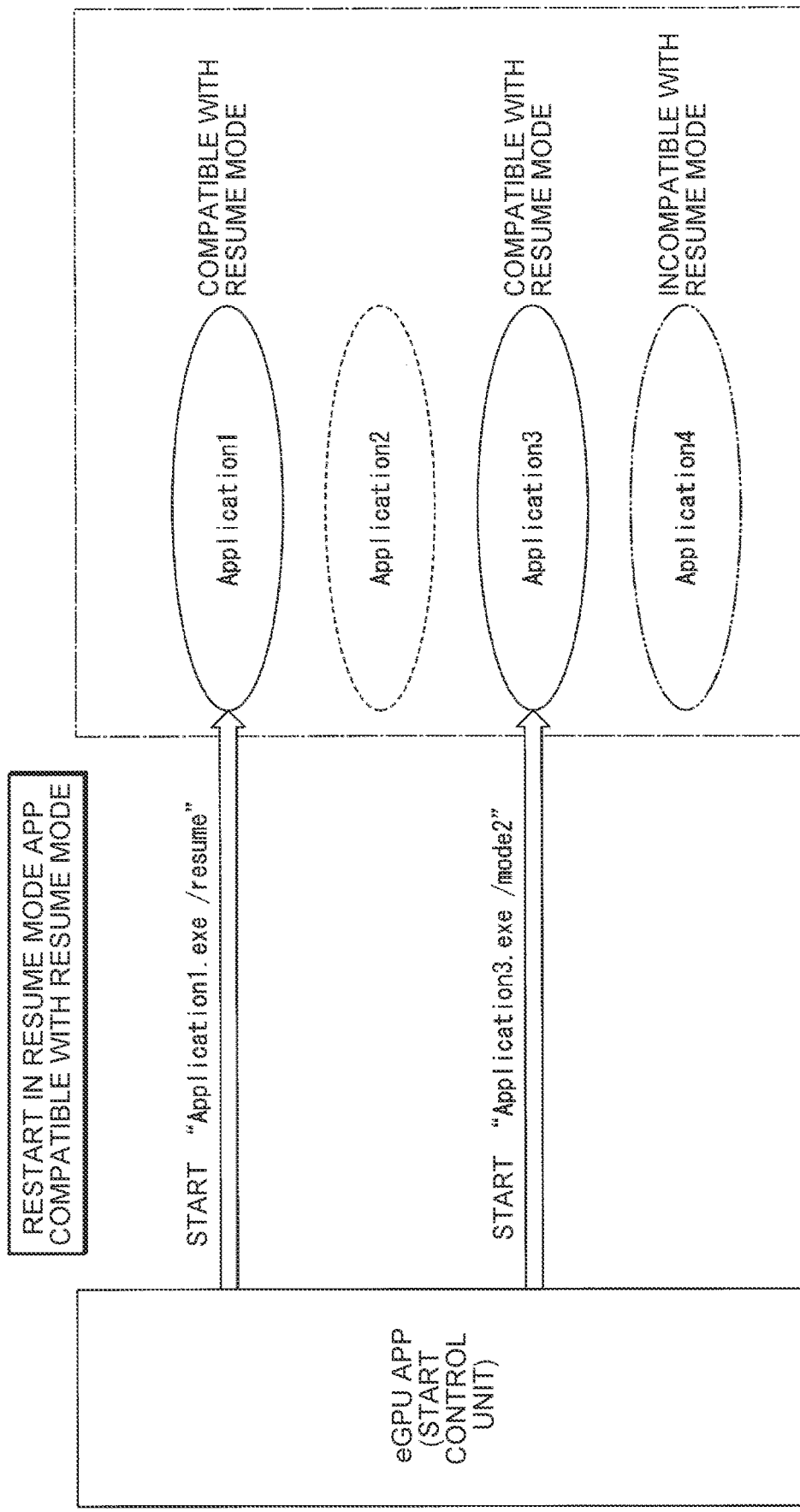
FIG. 9 is an explanatory diagram of processing for restarting applications compatible with the resume mode according to embodiments of the present disclosure.

FIG. 9 is an explanatory diagram of processing for restarting, in the resume mode, applications compatible with the resume mode. For example, as the resume command for starting application 1 in the resume mode, the start control unit 1126 issues "Application1.exe/resume" acquired by the command acquisition unit 1123. Further, as the resume command for starting application 3 in the resume mode, the start control unit 1126 issues "Application3.exe/mode2" acquired by the command acquisition unit 1123. Application 1 and application 3, to which the respective resume commands are issued, are respectively restarted, and files saved just before the exit are automatically read.

Figure 10:
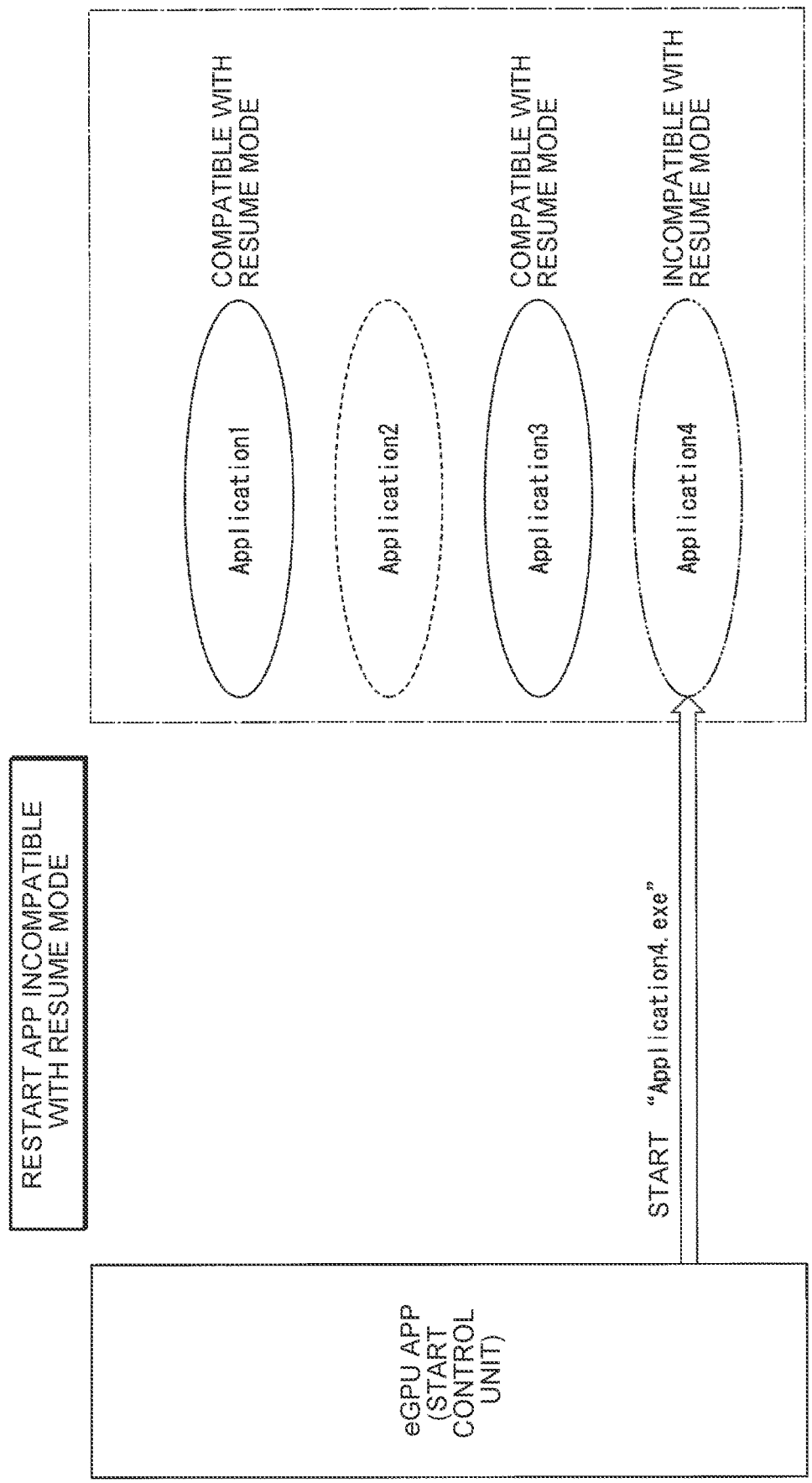
FIG. 10 is an explanatory diagram of processing for restarting an application incompatible with the resume mode according to embodiments of the present disclosure.

On the other hand, the start control unit 1126 issues, to any application incompatible with the resume mode, a start command for starting the application only to restart the application. FIG. 10 is an explanatory diagram of processing for restarting the application incompatible with the resume mode. For example, the start control unit 1126 issues a start command "Application4.exe" to start application 4 incompatible with the resume mode. Application 4 to which the start command is issued is only restarted. Therefore, the user manually reads, into restarted application 4, files saved just before the exit.

Figure 11:
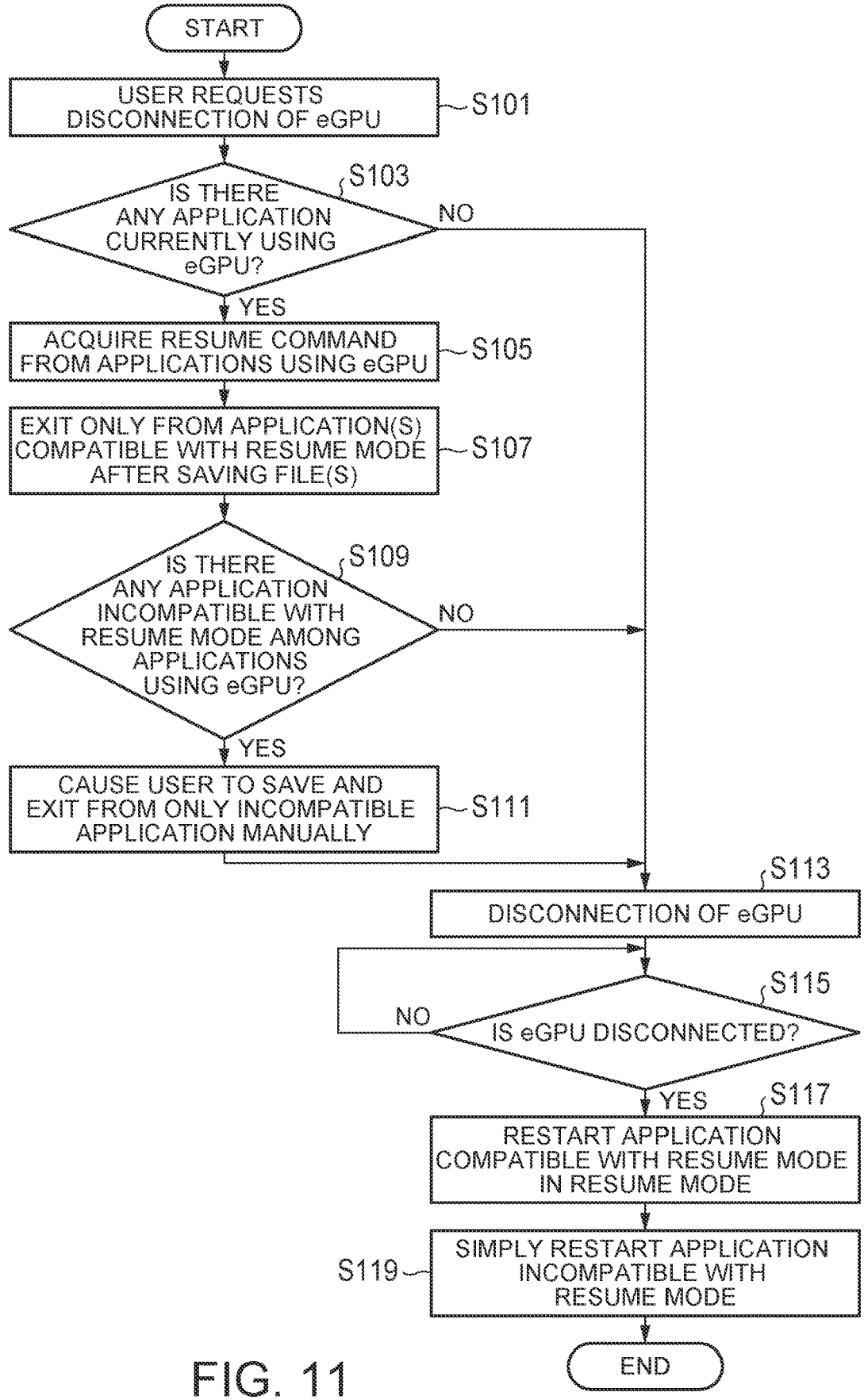
FIG. 11 is a flowchart illustrating an example of eGPU disconnection processing according to embodiments of the present disclosure.

Referring next to FIG. 11, the operation of eGPU disconnection processing executed by the CPU 112 of the personal computer 100 will be described. FIG. 11 is a flowchart illustrating an example of eGPU disconnection processing according to the embodiment.

(Step S101) When acquiring disconnection request information to request the disconnection of the external GPU device 200 (disconnection of the eGPU) based on a user's operation, the CPU 112 proceeds to processing in step S103.

(Step S103) The CPU 112 acquires a list of applications currently using the eGPU, and determines whether there is any application using the eGPU or not. When determining that there is no application using the eGPU (NO), the CPU 112 proceeds to processing in step S113. On the other hand, when there is any application using the eGPU (YES), the CPU 112 proceeds to processing in step S105.

(Step S105) The CPU 112 issues a command for acquiring the resume command to the application using the eGPU to acquire the description content of the resume command defined in the application using the eGPU. Then, the CPU 112 proceeds to processing in S107.

(Step S107) The CPU 112 issues the exit-after-save command only to the application compatible with the resume mode to exit after saving working files. The application compatible with the resume mode is an application from which the description content of the resume command was able to be acquired in step S105. Then, the CPU 112 proceeds to processing in step S109.

(Step S109) The CPU 112 determines whether there is any application incompatible with the resume mode among applications using the eGPU or not. The application incompatible with the resume mode is an application from which the description content of the resume command was not be able to be acquired in step S105 despite the fact that the exit-after-save command was issued. When determining that there is no application incompatible with the resume mode (NO), the CPU 112 proceeds to processing in step S113. On the other hand, when there is any application incompatible with the resume mode (YES), the CPU 112 proceeds to processing in step S111.

(Step S111) The CPU 112 displays information for urging the user to perform operations in order to exit from the application incompatible with the resume mode after saving working files. Then, after the user manually saves the files working in the application incompatible with the resume mode and exits from the application, the CPU proceeds to processing in step S113.

(Step S113) When there is no more application using the eGPU, the CPU 112 disconnects the external GPU device 200 (disconnects the eGPU), and proceeds to processing in step S115.

(Step S115) The CPU 112 determines whether the external GPU device 200 is disconnected (the eGPU is disconnected) or not. When determining that the disconnection is not made (NO), the CPU 112 continues this determination processing. When determining that the disconnection is made (YES), the CPU 112 proceeds to processing in step S117.

(Step S117) In the resume mode for starting after reading files saved just before the exit, the CPU 112 restarts the application compatible with the resume mode.

(Step S119) When there is any application incompatible with the resume mode (YES in step S109), the CPU 112 only restart the application. In this case, the user manually reads, into the restarted application (application 4), files saved just before the exit.

In the case of NO in step S109, since there is no application incompatible with the resume mode among applications using the eGPU, the eGPU disconnection processing is ended without executing processing in step S119.

Further, in the case of NO in step S103, since there is no application using the eGPU, the eGPU disconnection processing is ended without executing both processing in step S117 and processing in step S119.

As described above, the personal computer 100 (an example of an information processing apparatus) according to the embodiment can run applications (application programs), and includes the request information acquisition unit 1121 and the exit control unit 1124. The request information acquisition unit 1121 acquires disconnection request information to request the disconnection of the external GPU device 200 (an example of a signal processing device) that executes drawing processing by the applications to be executed. When the request information acquisition unit 1121 acquires the disconnection request information, the exit control unit 1124 issues, to an application(s) using the drawing processing by the external GPU device 200 among running applications, the exit-after-save command (an example of a first command) indicative of an instruction to exit after saving working files to the first storage unit 106 provided inside the personal computer 100.

Thus, upon disconnection of the external GPU device 200, the personal computer 100 can automatically exit from each application being used after saving working files open in the application without the need for the user to exit from application to application manually after saving working files. Thus, the personal computer 100 can reduce troublesome operations to disconnect the external GPU (eGPU) in order to improve convenience. Further, since there is no need to reboot the system of the personal computer 100, fast disconnection of the external GPU (eGPU) can be made. In addition, the personal computer 100 can reduce safety concerns about causing the applications and the system to hang up upon disconnection of the external GPU (eGPU), and this also contributes to the widespread use of the external GPU (eGPU).

For example, the personal computer 100 (the example of the information processing apparatus) internally includes the built-in GPU 112*a* (an example of a first drawing processing unit) for executing drawing processing on video data in processing performed by running an application(s). On the other hand, the external GPU device 200 (the example of the signal processing device) includes the eGPU 208 (an example of a second drawing processing unit) higher in processing capacity than the built-in GPU 112*a*.

Thus, since the personal computer 100 can connect the external GPU (eGPU) only when needed to attain graphics performance faster than the built-in GPU, and disconnect the external GPU (eGPU) without troublesome operations when not needed, it is convenient.

Further, the personal computer 100 (the example of the information processing apparatus) includes the start control unit 1126 configured to issue, to the applications to which the exit-after-save command (the example of the first command) are issued by the exit control unit 1124, the resume command (an example of a second command) indicative of an instruction to restart in the resume mode in which the applications are started after reading files saved in the first storage unit 106 internally included in the personal computer 100 when the disconnection of the external GPU device 200 (the example of the signal processing device) is detected.

Thus, since the applications using the external GPU (eGPU) before the disconnection are automatically restarted in the resume mode after the disconnection of the external GPU (eGPU), the personal computer 100 is convenient. For example, when the user wants to continue to work at a different working location by removing the external GPU (eGPU) after working with the eGPU connected, since the working files are automatically opened, this is helpful for the user to do work with good convenience.

The personal computer 100 (the example of the information processing apparatus) further includes the list acquisition unit 1122 and the command acquisition unit 1123. The list acquisition unit 1122 acquires a list of applications using drawing processing by the external GPU device 200 (the example of the signal processing device) among running applications in such a state that the external GPU device 200 is connected to the personal computer 100. Note that acquiring the list of applications also includes acquiring information capable of simply identifying the applications (for example, identification information). Based on the list of applications acquired by the list acquisition unit 1122, the command acquisition unit 1123 acquires information related to the resume command (the example of the second command) defined in each of the applications from the applications using the drawing processing by the external GPU device 200.

Thus, the personal computer 100 can select only the applications using the external GPU (eGPU) to restart the applications in the resume mode after the disconnection of the external GPU (eGPU).

Further, in the list of applications acquired by the list acquisition unit 1122, the exit control unit 1124 issues the exit-after-save command (the example of the first command) to an application(s) from which the information related to the resume command (the example of the second command) is acquired by the command acquisition unit 1123. On the other hand, in the list of applications acquired by the list acquisition unit 1122, the exit control unit 1124 urges the user to exit from an application(s) from which the information related to the resume command cannot be acquired by the command acquisition unit 1123 after saving working files.

Thus, among the applications using the external GPU (eGPU), when there is any application incompatible with the resume mode (for example, any application that does not support Requirement (Application Resume & Restart) for implementing the resume method for applications defined in Windows Vista® or later, since the user is urged to perform operations to exit from the application after saving working files, the system and the application can be prevented from hanging up upon disconnection of the external GPU (eGPU).

Note that the personal computer 100 (the example of the information processing apparatus) may also be configured to include at least the request information acquisition unit 1121, the list acquisition unit 1122, and the start control unit 1126. The request information acquisition unit 1121 acquires disconnection request information for requesting the disconnection of the external GPU device 200 (the example of the signal processing device). The list acquisition unit 1122 acquires a list of applications using drawing processing by the external GPU device 200 among running applications when the request information acquisition unit 1121 acquired the disconnection request information. Note that acquiring the list of applications also includes acquiring information capable of simply identifying the applications (for example, identification information). When the disconnection of the external GPU device 200 is detected, the start control unit 1126 issues, to each of the applications included in the list acquired by the list acquisition unit 1122 and closed after working files are saved to the first storage unit 106 provided inside the personal computer 100, the resume command (an example of a command) indicative of the instruction to start in the resume mode in which the application is started after files saved in the first storage unit 106 are read.

Thus, when the external GPU (eGPU) is removed after saving and exiting from apps using the eGPU automatically or manually, since the personal computer 100 can start, in the resume mode, the apps that were being used, this is helpful for the user to do work with good convenience.

Further, in the aforementioned embodiment, the example of starting in the resume mode on condition that the disconnection of the external GPU device 200 (the example of the signal processing device) is detected is described, but reconnection may also be used as a condition instead of the disconnection. For example, when it is detected that the external GPU device 200 (the example of the signal processing device) is reconnected after being disconnected, the start control unit 1126 may issue, to each of the applications to which the exit control unit 1124 issued the exit-after-save command (the example of the first command), the resume command (the example of the second command) indicative of the instruction to start in the resume mode in which the application is started after files saved in the first storage unit 106 provided inside the personal computer 100 (the example of the information processing apparatus) are read.

Thus, when the external GPU (eGPU) is connected, the personal computer 100 can automatically restart the applications using the eGPU before the last disconnection and automatically open the files that were open the last time around. This is helpful for the user to do work with good convenience.

Further, in the aforementioned embodiment, the example of Windows Vista® or later is described as the type of OS, but the type of OS is not limited thereto, and the embodiment can be applied to any other type of OS as long as the resume mode is defined.

Further, in the aforementioned embodiment, the example of urging the user to perform operations to exit from an application incompatible with the resume mode after saving working files is described, but the present invention is not limited to this example. For example, if even the application incompatible with the resume mode can respond to an instruction to exit after saving (for example, the exit-after-save command described above), the exit control unit 1124 may give the instruction (for example, issue the exit-after-save command) to exit from even the application incompatible with the resume mode automatically after saving working files. Thus, the personal computer 100 can reduce troublesome operations to disconnect the external GPU (eGPU) in order to improve convenience.

Further, in the aforementioned embodiment, the example in which the communication connection interface between the personal computer 100 and the external GPU device 200 is an interface compliant with the Thunderbolt® 3 standard is described, but this is just an example, and the interface may also be an interface compliant with any other standard.

Note that part or whole of each of the personal computer 100 and the external GPU device 200 according to the embodiment described above may be realized by a computer including one or more processors. In this case, a control function may be implemented by recording a program for implementing this control function on a computer-readable recording medium, and reading, into a computer system, and executing the program recorded on this recording medium.

Note that the "computer system" here is a computer system incorporated in each of the personal computer 100 and the external GPU device 200, which includes an OS and hardware such as a peripheral device and the like. Further, the "computer-readable recording medium" means a storage medium such as a flexible disk, a magneto-optical disk, a ROM, a portable medium like a CD-ROM, or a hard disk incorporated in the computer system.

The "computer-readable recording medium" may also include a medium on which the program is dynamically held for a short time when the program is transmitted through a communication line such as a network like the Internet or a telephone line, i.e., a volatile memory inside the computer system as a server or a client to hold the program for a given length of time. The above-mentioned program may also be to implement some of the functions described above. Further, the program may be to implement the above-described functions in combination with a program(s) already recorded in the computer system.

Further, part or whole of each of the personal computer 100 and the external GPU device 200 according to the embodiment described above may be realized as an integrated circuit typified by an LSI circuit or as a chipset. Further, each functional block of the personal computer 100 and the external GPU device 200 in the above-described embodiment and variations may be formed into a chip individually, or some or all of the functional blocks may be integrated into a chip. Further, the method of circuit integration is not limited to LSI, and it may be realized by a dedicated circuit and/or a general-purpose processor. Further, if integrated circuit technology replacing the LSI appears with the progress of semiconductor technology, an integrated circuit according to the technology can also be used.

In the aforementioned embodiment, the external GPU device 200 used to perform drawing processing is described as the example of the external signal processing device connected to the personal computer 100, but the external signal processing device is not limited to the external GPU device 200. Instead of the external GPU device 200, the external signal processing device may be any other external signal processing device used to perform any processing other than the drawing processing. For example, the embodiment can also be applied to an accelerator for calculation called virtual currency mining or DeepLearning computation unrelated to graphics as an external signal processing device instead of the external GPU device 200 to be connected to the personal computer 100.

While one embodiment of this invention has been described in detail above with reference to the accompanying drawings, the specific configurations are not limited to those described above, and various design changes are possible without departing from the scope of this invention. Further, various changes can be made to the aspects of the present invention within the scope of the invention as set forth in claims, and any other embodiment obtained by combining technical means as set forth in different aspects of the present invention respectively shall be included in the technical scope of the present invention. Further, such a configuration in which components described in the aforementioned embodiment and variations and having the same effects are replaced shall also be included.

What is claimed is:

1. An information processing apparatus capable of executing an application, comprising:
    a request information acquisition unit configured to acquire disconnection request information for requesting disconnection of an external signal processing device, where the external signal processing device is configured to execute at least part of signal processing in processing performed by running the application;
    a storage unit capable of storing files utilized by the application;
    an exit control unit configured to issue a first command, the first command indicative of an instruction to exit after saving working files to the storage unit, to an application using signal processing by the external signal processing device among running applications in response to the request information acquisition unit receiving the disconnection request information;
    a start control unit configured to issue a second command, the second command indicative of an instruction to restart in a resume mode for starting after reading the files saved in the storage unit, to the application to which the exit control unit issues the first command when the disconnection of the signal processing device is detected; and
    a command acquisition unit configured to acquire information related to the second command defined in each application from the applications using signal processing by the signal processing device based on a list of application acquired by a list acquisition unit, where the information comprises application-specific information related to the resume mode.

2. The information processing apparatus according to claim 1, wherein the list acquisition unit is configured to acquire the list of applications using signal processing by the signal processing device among the running applications.

3. The information processing apparatus according to claim 2, wherein the exit control unit issues the first command to an application from which the command acquisition unit acquires the information related to the second command in the list of applications acquired by the list acquisition unit, and the exit control unit urges a user to perform operations to exit, after saving working files, from an application from which the command acquisition unit cannot acquire the information related to the second command in the list of applications acquired by the list acquisition unit.

4. The information processing apparatus according to claim 1, wherein the start control unit is further configured to issue a third command, indicative of an instruction to start in a resume mode for starting after reading the files saved in the storage unit, to the application to which the exit control unit issues the first command when reconnection of the signal processing device after the disconnection is detected.

5. The information processing apparatus according to claim 1, wherein the information processing apparatus internally includes a first signal processing unit configured to execute signal processing performed by running an application, and the signal processing device includes a second signal processing unit having a processing capacity higher than that of the first signal processing unit.

6. A system comprising:
- a request information acquisition unit configured to acquire disconnection request information for requesting disconnection of an external signal processing device, where the external signal processing device is configured to execute at least part of signal processing;
- a list acquisition unit configured to acquire a list of applications using signal processing by the signal processing device among applications running when the request information acquisition unit acquires the disconnection request information;
- a storage unit capable of storing files working in the applications;
- a start control unit configured to issue a command, indicative of an instruction to start in a resume mode for starting after reading files saved in the storage unit, to an application included in the list acquired by the list acquisition unit and closed after saving the working files to the storage unit when the disconnection of the signal processing device is detected; and
- a command acquisition unit configured to acquire information related to the command defined in each application from the applications using signal processing by the signal processing device based on the list of applications acquired by the list acquisition unit, where the information comprises application-specific information related to the resume mode.

7. The system of claim 6, further comprising an exit control unit configured to issue a second command, the second command indicative of an instruction to exit after saving working files to the storage unit, to an application using signal processing by the signal processing device among running applications in response to the request information acquisition unit receiving the disconnection request information.

8. The system of claim 7, wherein the exit control unit issues the second command to an application from which the command acquisition unit acquires the information related to the second command in the list of applications acquired by the list acquisition unit.

9. The system of claim 8, wherein the exit control unit urges a user to perform operations to exit, after saving working files, from an application from which the command acquisition unit cannot acquire the information related to the second command in the list of applications acquired by the list acquisition unit.

10. The system of claim 6, further comprising an internal first signal processing unit configured to execute signal processing performed by running an application.

11. The system of claim 10, further comprising an internal second signal processing unit having a processing capacity higher than that of the first signal processing unit.

12. A program product comprising a computer readable storage medium that is not a transitory signal that stores code executable by a processor, the executable code comprising code to:
- acquire, by a request information acquisition unit, disconnection request information for requesting disconnection of an external signal processing device that is configured to execute at least part of signal processing in processing performed by running an application;
- store, at a storage unit, files utilized by the application;
- issue a first command, by an exit control unit, indicative of an instruction to exit after saving working files to a storage unit, to an application using signal processing by the signal processing device among running applications when the request information acquisition unit acquires the disconnection request information;
- issue a second command, by a start control unit, indicative of an instruction to restart in a resume mode for starting after reading the files saved in the storage unit, to the application to which the exit control unit issues the first command when the disconnection of the signal processing device is detected; and
- acquire, by a command acquisition unit, information related to the second command defined in each application from the applications using signal processing by the signal processing device based on a list of application acquired by a list acquisition unit, where the information comprises application-specific information related to the resume mode.

13. The program product of claim 12, further comprising code to acquire the list, by the list acquisition unit, of applications using signal processing by the signal processing device among the running applications.

14. The program product of claim 13, wherein the exit control unit issues the first command to an application from which the command acquisition unit acquires the information related to the second command in the list of applications acquired by the list acquisition unit, and the exit control unit urges a user to perform operations to exit, after saving working files, from an application from which the command acquisition unit cannot acquire the information related to the second command in the list of applications acquired by the list acquisition unit.

15. The program product of claim 12, further comprising code to, by the start control unit, to issue a third command, indicative of an instruction to start in a resume mode for starting after reading the files saved in the storage unit, to the application to which the exit control unit issues the first command when reconnection of the signal processing device after the disconnection is detected.

* * * * *